(12) United States Patent
Kasarabada et al.

(10) Patent No.: US 7,856,054 B1
(45) Date of Patent: Dec. 21, 2010

(54) SCENE CHANGE IDENTIFICATION DURING ENCODING OF COMPRESSED VIDEO

(75) Inventors: Vikrant Kasarabada, Mountain View, CA (US); Vaidyanath Mani, Sunnyvale, CA (US); Haitao Guo, San Jose, CA (US)

(73) Assignee: Apple Inc., Cupertino, CA (US)

( * ) Notice: Subject to any disclaimer, the term of this patent is extended or adjusted under 35 U.S.C. 154(b) by 2122 days.

(21) Appl. No.: 10/714,076

(22) Filed: Nov. 14, 2003

(51) Int. Cl.
*H04N 7/12* (2006.01)
*H04N 5/14* (2006.01)

(52) U.S. Cl. .................. 375/240.03; 348/700
(58) Field of Classification Search ..............................
375/240.01–240.06, 240.12–240.16, 240.26; 348/699–700
See application file for complete search history.

(56) References Cited

U.S. PATENT DOCUMENTS

| | | | | |
|---|---|---|---|---|
| 5,321,776 | A * | 6/1994 | Shapiro | 382/240 |
| 5,404,174 | A * | 4/1995 | Sugahara | 348/700 |
| 5,461,679 | A | 10/1995 | Normile et al. | |
| 5,642,174 | A * | 6/1997 | Kazui et al. | 348/700 |
| 5,708,767 | A | 1/1998 | Yeo et al. | |
| 5,731,835 | A * | 3/1998 | Kuchibholta | 348/390.1 |
| 5,774,593 | A | 6/1998 | Zick et al. | |
| 6,018,367 | A | 1/2000 | Handley | |
| 6,108,448 | A | 8/2000 | Song et al. | |
| 6,233,278 | B1 * | 5/2001 | Dieterich | 375/240.03 |
| 6,351,493 | B1 * | 2/2002 | Reed et al. | 375/240.13 |
| 6,408,030 | B1 * | 6/2002 | Koda | 375/240.26 |
| 6,563,549 | B1 * | 5/2003 | Sethuraman | 348/700 |
| 6,690,732 | B2 * | 2/2004 | Naito et al. | 375/240.24 |
| 6,804,301 | B2 * | 10/2004 | Wu et al. | 375/240.12 |
| 7,092,040 | B1 * | 8/2006 | Watanabe | 348/700 |

OTHER PUBLICATIONS

Chua et al., A General Framework for Video Segmentation Based on Temporal Multi-resolution Analysis, Proceedings of International Workshop on Advanced Image Technology, Jan. 2000, pp. 119-124, Fujisawa, Japan.
Gargi et al., Performance Characterization and Comparison of Video Indexing Algorithms, Proceedings of IEEE Conference on Computer Vision and Pattern Recognition, 1998, pp. 559-565.
Günsel et al., Content-Based Video Abstraction, International Conference on Image Processing, Oct. 1998, vol. 3.
Khan et al., Motion Based Object Tracking in MPEG-2 Stream for Perceptual Region Discriminating Rate Transcoding, Proceedings of the Ninth ACM International Conference on Multimedia, 2001, vol. 9, pp. 572-576.

* cited by examiner

*Primary Examiner*—David Czekaj
(74) *Attorney, Agent, or Firm*—Fenwick & West LLP

(57) ABSTRACT

A video encoder identifies scene changes during the encoding of video sequences based on the distribution of macroblock types within each image. Once an image is identified as a scene change, control information is sent to a quantizer to adjust the quantization of the image to improve image quality. The image quantization is improved without changing the frame or picture type of the image within its group of pictures. To improve the image quality, the quantizer can directly or indirectly change the quantization parameter used to quantize the DCT coefficients for the image.

61 Claims, 1 Drawing Sheet

SCENE CHANGE IDENTIFICATION DURING ENCODING OF COMPRESSED VIDEO

FIELD OF INVENTION

The present invention relates generally to scene change detection and bit rate control in video encoding, and more particularly, to scene change identification and bit rate control during the encoding of compressed video images.

BACKGROUND OF THE INVENTION

Scene change detection in digitized video is the process of identifying changes in the video data that are likely to represent semantically meaningful changes in the video content, typically associated with a change in shot or scene. Scene change detection is useful particularly for video indexing and archiving, and allows for user to "browse" video. Conventional scene change detection is typically applied during the playback of video. Numerous algorithms have been created to identify scene changes, relying variously on histogram analysis of color, luminance, and other image characteristics, and in some cases on analysis of motion vectors. These approaches have been likewise extended to identify scene changes in compressed video content, such as MPEG-2 video. However, these approaches require the computationally expensive process of first decoding the compressed video prior to do the scene change analysis, in order to obtain the necessary statistics and data, such as motion vectors, color data, and the like.

Some researchers have explored using motion vector information created during the MPEG encoding process, relying on the amount and magnitude of motion vectors, as well as mean square prediction error, to identify scene changes relative to a last reference frame. This approach however may falsely identify scene changes where there has been gradually changing image content in an otherwise continuous scene. In addition, these methods do not advantageously adjust the bit rate used for image encoding, but instead attempt to improve image quality to forcing a change in the frame type.

Accordingly its desirable to provide an improved scene identification process during the encoding of compress video. It is further desirable to use the scene change information to modify the bit rate for improved image quality.

SUMMARY OF THE INVENTION

The present invention includes a scene change identification process that operates during the encoding of compressed video, and that provides for flexible control of the bit rates used during the encoding process. Generally, an uncompressed image is received in an encoder or encoding process. The uncompressed image comprises macroblocks, and will have a frame type, such as an I frame, a P frame, or a B frame, as is known in the art. Each macroblock will also have a type, corresponding to one of these types, resulting from a motion compensation process. From the distribution of the types of the macroblocks, a determination is made as to whether the image corresponds to a scene change. In one embodiment, the determination of whether the image corresponds to a scene change is made based on various percentages of predicted motion macroblocks relative to a total number of macroblocks. The percentage of motion blocks is compared with a threshold to determine whether the frame represents a scene change. Based on this determination and the type of the frame, a scene change is determined. Preferably, when a scene change is detected, the encoder allocates a greater number of bits to the frame, without changing the frame type. The frame is then encoded based on rate control parameter. The encoder can also generate a side information file that contains the scene change information to create a scene table of contents.

DETAILED DESCRIPTION

Figure 1:
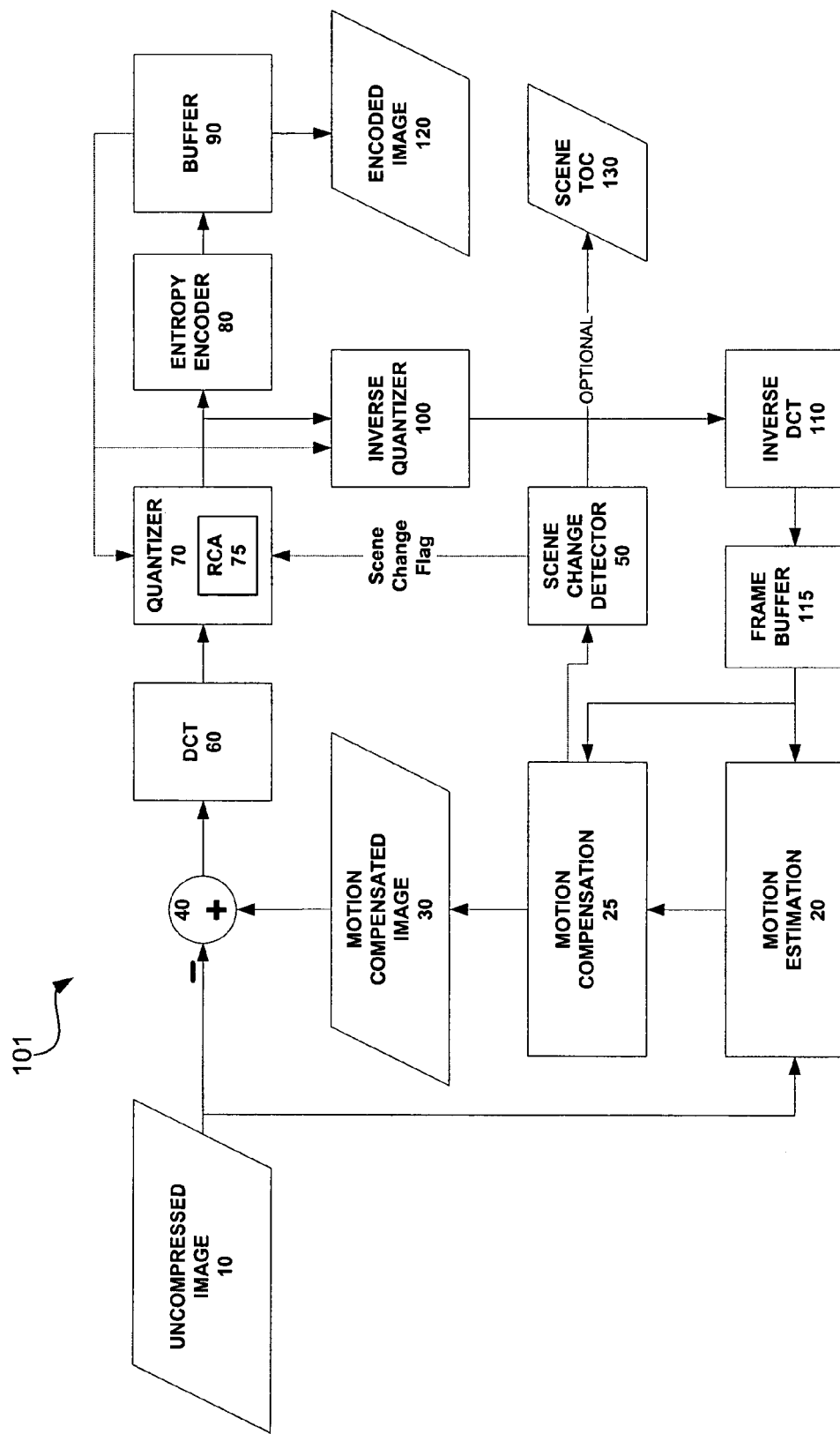
FIG. 1 is a block diagram of a video encoder according to one embodiment of the invention.

Referring now to FIG. 1, there is shown a block diagram of an encoder 101 according to one embodiment of the present invention. The encoder 101 generally operates according to principles of an MPEG-1 or MPEG-2 video encoder as described in ISO/IEC 11172 and ISO/IEC 13818 or similar hybrid DPCM/DCT encoder, with the additional features and structures as further described below. The encoder 101 is used to encode a video sequence that comprises a plurality of uncompressed images 10. These images are input into the encoder 101 along with side information that describes the bit-rate and the group of pictures pattern to be used in the encoding. The encoder then determines the position of an image in the group of pictures. The image 10 data comprises a plurality of macroblocks, each macroblock having either 4:x:x sample format of luminance and chrominance data, depending on the implementation.

The type of image (equivalently "frame" or "picture") will be one of an intra-pictures (I), a forward predicted picture (P), or a bi-directional predicted (B) picture. Intra-pictures (I-pictures) are coded without reference to other pictures contained in the video sequence. Inter-frame predicted pictures (P-pictures) are coded with reference to the nearest previously coded I-picture or P-picture, usually incorporating motion compensation to increase coding efficiency. Bi-directionally predicted (B-pictures) use both past and future frames as references. To achieve high compression, motion compensation can be employed based on the nearest past and future P-pictures or I-pictures. B-pictures themselves are never used as references.

The encoder 101 uses different encoding processes depending on the type of the image. P and B type frames are encoded as follows. The image macroblocks are input into both subtractor 40 and motion estimator 20. The motion estimator 20 compares each of these current image's macroblocks with macroblocks in a previously stored reference picture or pictures. For each current macroblock, the estimator 40 finds a macroblock in a reference picture that most closely matches the current macroblock. The motion estimator 40 then calculates a motion vector that represents the horizontal and vertical displacement from the current macroblock being encoded to the matching macroblock in the reference picture. When completed for all of the macroblocks in the current image, the result is a set of motion vectors corresponding to the macroblocks of the current image. Each macroblock will be also coded as either a forward predicted (P), backward predicted (B), intra (I), or skip (S) block, depending on the motion vector information for the block, if any, and the frame type. For a B frame, motion predicted blocks will be either P or B blocks, depending on the reference picture used for the particular macroblock; otherwise, the blocks will be I or S blocks. For a P frame, the blocks will be either P, S, or I blocks. These motion vectors data and block information are passed to the motion compensation stage 25, which applies them to the reference image(s) to create a motion compensated image 30.

The motion compensated image 30 is then subtracted from the original image 10 by subtractor 40 to produce a set of error prediction or residual signals for each macroblock (in practice this step takes place on macroblock by macroblock basis directly following motion estimation). This error prediction signal represents the difference between the predicted image and the original image 10 being encoded. In the case that the original image 10 is a B- or P-picture, the motion compensated image 30 is an estimation of the original image 10. In the case that the original image 10 is an I-picture, then the motion compensated image 30 will have all pixel values being equal to zero, and the quantized DCT coefficients represent transformed pixel values rather than residual values as was the case for P and B pictures. For I frames, the quantized coefficients are used to reconstruct the I frame as a reference image via inverse quantizer 100 and inverse DCT 110. The reconstructed image is store in frame buffer 115.

In accordance with the present invention, the macroblock type data from the motion estimator 20 is input into scene change detector 50. The scene change detector 50 determines whether there has been a scene change at the current image based on the distribution of the macroblock types, such as the I, P, B, and S blocks, and the frame type of the current frame. In one embodiment, the scene change detector 50 identifies a scene change by comparing the percentages of P, B, or I blocks in the image to one or more thresholds. Preferably, the particular threshold comparison depends on the picture type of the current frame, since the distribution of block types in a scene change tends to differ depending on the frame type. If the percentage of P, B or I blocks exceeds the threshold amount(s), then the image is deemed to be a scene change. (Those of skill in the art appreciate that the comparisons can be equivalently implemented so that a scene change is determined if the percentages do not exceed the thresholds).

Having determined whether the current image is a scene change, the scene change detector 50 provides a scene change flag to the quantizer 70 to indicate a scene change. The quantizer 70 responds to the scene change flag by increasing the number of bits used to quantize the image, thereby increasing the quality of the encoded image. This may be done either directly, by changing the quantization step size, or indirectly by adjusting a rate controller internal to the quantizer 70. The details of the quantization control are further described below.

In one embodiment, the scene change detector 50 operates as follows. As noted above, there are three types of frames or pictures that will be received by the encoder: I, P, and B frames. If the current frame is an I frame, and a scene change (as would be perceived by a viewer) has in fact occurred here, there is no need for the scene change detector 50 to instruct the quantizer 70 to allocate additional bits during quantization. This is because the I frame will already be entirely intra-coded, and will provide sufficient image quality. In one embodiment in which the scene change detector 50 builds a scene table of contents (TOC) 130, the scene change detector 50 generates index information that identifies the current image as a scene change, for example by outputting the current group of pictures (GOP) index, and the frame number of the current frame within the current GOP. The scene TOC 103 can be transmitted to, subsequently decoded by a complementary decoder to provide the viewer with access to a scene change table of contents or the like.

The second case is where the current frame is a B frame, which will have two reference frames, one forward and one behind. If a scene change occurs at a B frame, then the motion vectors for that frame should mostly point in one direction, either forward, or backward, and hence the distribution of P and B blocks will indicate a scene change.

The scene change detector 50 uses a threshold-based test to detect this situation, and to ignore the false positives (that is, instances that are not actual scene changes). In one embodiment, the tests and thresholds are determined as follows. A total number macroblocks (M) is set. M can be a fixed, based on the total number of macroblocks given the frame size. Alternatively, M can be set to the total number of motion predicted blocks (including forward and backward predicted); this is the same as the total number of macroblocks in the frame minus S and I blocks. The scene change detector 50 then calculates various ratios:

Percent Forward Predicted (PF)=number of forward predicted blocks/$M$

Percent Backward Predicted (PB)=number of backward predicted blocks/$M$

In one embodiment, the scene change threshold for these percentages is set at 70%. Accordingly, if either PF or PB is greater than 0.70, then a scene change is declared. Where I and S blocks are not included in M, the scene change threshold is correspondingly decreased, with the appropriate percentages based on sample video data. Also, an optional threshold test is the percentage of I blocks relative to M. This test operates on the converse principle to the above tests, and if the percentage is below a selected threshold, then a scene change is declared. The selection of which type of test to use is a matter of implementation preference, as both types of tests yield essentially the same result.

The third case is where the current frame is a P frame. As described above, a P frame is encoded based on a prior I frame. The blocks in the P frame then will be distributed among I, S, and P blocks. If a scene change has not occurred at the current P frame, then there should be a high proportion of P blocks, since the will be well predicted by the prior I frame. On the other hand, a scene change at the P frame would correspond to a significant amount of new material in the frame, as compared to a prior reference frame. This means that for such a scene change, the motion estimator 20 should have been unable to find a significant number of matches for the P frame from the blocks of prior reference frame. As a result, in a P frame, a scene change correlates to a relatively high number of I blocks in the frame (since relatively few blocks were motion predicted).

More specifically, the scene change detector 50 can implement the foregoing logic in a variety of ways. In one embodiment, the scene change detector 50 determines the percentage of I blocks (PI) relative to M. If PI is greater than 65%, then a scene change is declared. Alternatively, the scene change detector 50 can compute the ratio of I blocks to P blocks, and declare a scene change when this ratio is greater than about 2 (that is, more than about two thirds of the frame are I blocks). Those of skill in the art will appreciate the variety of ways in which statistics of the distribution of blocks types can be computed and selected in view of the teachings of the present invention.

Regardless of how the scene change detector 50 identifies a scene change in either a P or B frame, the scene change detector 50 provides a scene change flag to the quantizer 70. This is done without changing the type of the current image to an I frame (from either a P frame or a B frame) as is done in conventional approaches to which use scene change information to improve encoding. Instead, the present invention maintains the frame type of the current image, and instead increases the number of bits used to encode the image, thereby directly improving the image quality.

Optionally, the scene change detector 50 further generates index information that identifies the current P or B frame as a scene change, by outputting the current GOP index, and the frame number of the current frame within the current GOP, and updating the scene TOC 130.

The residual signals from subtractor 40 are transformed from the spatial domain by a two dimensional DCT 60, to produce a set of DCT coefficients for each residual macroblock. The DCT coefficients of the residual macroblocks are quantized by quantizer 70 to reduce the number of bits needed to represent each coefficient. The quantizer 70 uses a bit rate control algorithm that adjusts the bit rate based on the image type and the scene change flag received from the scene change detector 50. For P type pictures, the quantized coefficients are passed back through an inverse quantizer 100 and inverse DCT 110 to creates a reconstructed image which is stored in frame buffer 115, and made available as input into the motion estimator 20 and motion compensation 30 as needed. The reconstructed image is equal to the image, which will be found at the receiver side, if no transmission errors have occurred.

As shown by the control signal path from buffer 90 to the quantizer 70, the type of the picture and the amount of data in the buffer 90 control the quantization. In a conventional encoder, if the amount of data in the buffer increases (e.g., when the buffer is holding an image that include significant amounts of intra encoded data), the bit rate control algorithm would increase the quantization step size, resulting in a coarser quantization, which would to decrease the image quality of the current image, even if the current image corresponds to a scene change. The encoder 101 of the present invention however does not suffer from this defect, since the scene change detector 50 can influence the degree of quantization based on the presence or absence of a scene change.

The quantizer 70 operates as follows, in one embodiment. The quantizer 70 maintains two bit rate variables: T is a variable that tracks the total number of bits allocated for current frame in the GOP. R is a variable that tracks the number of bits remaining after encoding each frame in the GOP. A rate control algorithm 75 in the quantizer 70 uses these variables allocate bits to each frame to be encoded. The rate controller 75 will allow the number of bits allocated to a frame to vary by about +/−2-3% per frame. The ability of the rate control algorithm 75 to stick to a target allocation is a measure of the efficiency of the rate control and encoder.

The quantizer 70 receives a scene change flag from the scene change detector 50 with each frame; the flag will indicate whether or not the current frame corresponds to a scene change. If there is a scene change, and the frame type is a P or B frame, the rate control algorithm 75 increases either T or R, or both, by an encoding factor X. This gives the quantizer 70 the illusion, so to speak, that there are actually more bits available for quantizing the image than in fact are allocated.

The value of the encoding factor X ultimately determines the quantization rate (or step size) used by the quantizer 70, and thus the quality of the current image. However, X cannot be arbitrarily set to any amount. If X is too large, then T and R are increased too much, and the result is that the number of bits used for the frame will exceed the target allocation. If X is too small, then it will not help to increase quality of the image in any significant way, because the quantization step size will not have been sufficiently decreased. In a preferred embodiment, the bit factor X is variable and is proportional to the current value of T, and both T and R are increased by X. In one embodiment, X=0.125T; thus:

$$T = T + 0.125T; \text{ and}$$

$$R = R + 0.125T.$$

This allows X to be easily encoded as a power of 2, and thus readily bit shifted to increase or decrease the level of quantization.

More specifically, increasing the value of R by the encoding factor X results in an increase of the target bit rate allocation Tp or Tb depending on whether the current frame is a P or B frame. For a P frame, T=Tp and for a B frame T=Tb.

Tp and Tb are generally calculated as follows:

$$T_p = \max\left\{\frac{R}{\left(N_p + \frac{N_b K_p X_b}{K_b X_p}\right)}, \frac{\text{bit\_rate}}{8 \times \text{picture\_rate}}\right\}$$

$$T_b = \max\left\{\frac{R}{\left(N_b + \frac{N_p K_b X_p}{K_p X_b}\right)}, \frac{\text{bit\_rate}}{8 \times \text{picture\_rate}}\right\}$$

Where Kp and Kb are "universal" constants dependent on quantization matrices, with typical values of Kp=1.0 and Kb=1.4; N is the number of pictures in the current GOP; Np and Nb are the number of P-pictures and B-pictures remaining in the current GOP in the encoding order; and bit rate and picture rate are previously determined factors.

From the revised target allocations Tb or Tp, a fullness measure $d_j^p$ $d_j^b$ is computed, where:

$$d_j^p = d_0^p + B_{j-1} - \left(\frac{T_p \times (j-1)}{\text{MB\_cnt}}\right)$$

$$d_j^b = d_0^b + B_{j-1} - \left(\frac{T_b \times (j-1)}{\text{MB\_cnt}}\right)$$

depending on the picture type, where $d_0^i, d_0^p, d_0^p$ are initial fullnesses of virtual buffers, one for each picture type. Bj is the number of bits generated by encoding all macroblocks in the picture up to and including a current macroblock j; MB_cnt is the number of macroblocks in the picture.

From the fullness measures, the quantizer 70 then computes the quantization parameter Qj for macroblock j as follows:

$$Q_j = \left(\frac{d_j \times 31}{r}\right)$$

where the "reaction parameter" r is given by $$r = 2 \times \frac{\text{bit\_rate}}{\text{picture\_rate}}$$

and dj is the fullness of the appropriate virtual buffer. Finally, the quantization parameter Qj is used to quantize the DCT coefficients for the current macroblock. Further details of the quantization process may be found in the documentation for Test Model 5 for the MPEG Software Simulation Group, MPEG Doc. No. MPEG 93/457 (April, 1993).

In summary, increasing T and R results in an increase in the number of bits allocated to the current type of frame, which in turn decreases the fullness measure for the current frame type as well. This decrease in the fullness measure in turn reduces Q. In an alternative embodiment, T alone is increased by X, which will also have a similar net effect on reducing Q. Similarly, R alone can be increased. In yet another embodiment, R and T can be increased by different amounts. In a further embodiment, Q can be reduced directly based on the above equations.

After the quantization of the DCT coefficients is performed, the rate control algorithm 75 subtracts X from T and from R, essentially restoring them to their prior values. R is then updated to reflect the actual number of bits used to encode the current frame. The temporary values T and R do not effect the operation of the inverse quantizer 100.

Following the quantization, the quantized DCT coefficients are entropy encoded in entropy encoder 80 which further reduces the average number of bits per coefficient. The resulting encoded coefficients are combined with the motion vector data and other side information (including an indication of I, P or B picture) and sent to an image buffer 90, which buffers the output bitstream to produce encoded image 120.

Once the video sequence of uncompressed images 10 is encoded, the overall output will be an encoded, compressed video file, which can also contain the scene TOC 130. The encoder 101 can augment the scene TOC 130 by including a representative image for each of identified scene changes; the representative image is preferably a subsampled version of the identified frame, and can likewise be encoded prior to transmission or storage. Alternatively, the representative frames can be generated on a compliant decoder by subsampling the identified images in the scene TOC 130. These representative images can then be displayed to a viewer, to allow the viewer to jump to the beginning of each scene as desired.

We claim:

1. A method of encoding video images, where each image has a frame type, the method executed by a computer and comprising:
    receiving a plurality of macroblocks for an uncompressed image;
    determining a macroblock type for each macroblock;
    determining whether the image represents a scene change based upon a distribution of macroblock types of the macroblocks and the frame type of the image, wherein the scene change is determined as a function of a percentage of prediction macroblocks in the image;
    encoding the image without changing the frame type of the image in response to the determination of a scene change and the frame type of the image; and
    outputting the encoded image.

2. The method of claim 1, wherein determining whether the image represents a scene change, comprises:
    responsive to the image being a forward predicted frame type, determining a percentage of intra-encoded macroblocks; and
    responsive to the percentage of intra-encoded macroblocks, identifying a scene change at the image.

3. The method of claim 2, further comprising:
    responsive to the percentage of intra-encoded macroblocks exceeding a threshold, identifying a scene change at the image.

4. The method of claim 3, wherein the threshold is about 0.65.

5. The method of claim 1, wherein determining whether the image represents a scene change, comprises:
    responsive to the image being a bidirectionally predicted frame type, determining a percentage of backward predicted macroblocks; and
    responsive to the percentage of backward predicted macroblocks, identifying a scene change at the image.

6. The method of claim 5, further comprising:
    responsive to the percentage of backward predicted macroblocks exceeding a threshold, identifying a scene change at the image.

7. The method of claim 6, wherein the threshold is about 0.70.

8. The method of claim 6, wherein the threshold is about 0.70.

9. The method of claim 5, further comprising:
    responsive to the percentage of forward predicted macroblocks exceeding a threshold, identifying a scene change at the image.

10. The method of claim 1, wherein determining whether the image represents a scene change, comprises:
    responsive to the image being a bidirectionally predicted frame type, determining a percentage of forward predicted macroblocks; and
    responsive to the percentage of forward predicted macroblocks, identifying a scene change at the image.

11. The method of claim 1, wherein determining whether the image represents a scene change, comprises:
    responsive to the image being a forward predicted frame type, determining a percentage of intra-encoded macroblocks;
    responsive to the image being a bidirectionally predicted frame type, determining a percentage of backward predicted macroblocks;
    responsive to the image being a bidirectionally predicted frame type, determining a percentage of forward predicted macroblocks; and
    responsive to a determined percentage exceeding a threshold corresponding to the type of macroblock, identifying the image as a scene change.

12. The method of claim 1, wherein encoding the image in response to the determination of a scene change and the type of the frame comprises increasing a number of bits used to encode the image, without changing the frame type of the image.

13. The method of claim 1, wherein encoding the image in response to the determination of a scene change and the type of the frame comprises changing a quantization rate used to quantize the image, without changing the frame type of the image.

14. The method of claim 1, wherein encoding the image in response to the determination of a scene change and the type of the frame comprises temporarily increasing a counter of a number of bits available for encoding a remaining set of images in a group of images containing the uncompressed image.

15. The method of claim 1, wherein encoding the image in response to the determination of a scene change and the type of the frame comprises temporarily increasing a counter of a number of bits allocated to images having a same frame type as the frame type of the uncompressed image, in a group of images including the uncompressed image.

16. The method of claim 1, further comprising:
    responsive to determining a scene change, generating data identifying the uncompressed image as corresponding to a scene change, and storing the generated data in a side information file for transmission or storage.

17. A computer system for encoding video images, comprising:
  a processor;
  a memory;
  a motion estimator adapted to receive from the memory a plurality of macroblocks for an uncompressed video image, the image having a frame type, and to determine macroblocks types for the macroblocks;
  a scene change detector coupled to the motion estimator and adapted to determine whether the image represents a scene change based upon a distribution of the macroblock types of the image macroblocks and the frame type of the image, wherein the scene detector determines whether the image represents a scene change as a function of a percentage of prediction macroblocks in the image; and
  a quantizer coupled to the scene change detector for encoding the image without changing the frame type of the image in response to the determination of a scene change by the scene change detector and the frame type of the image, and for storing the encoded image in the memory;
  wherein the motion estimator, scene change detector, and the quantizer are executed by the processor.

18. The system of claim 17, wherein the scene change detector determines whether the image represents a scene change by determining a percentage of intra-encoded macroblocks in response to the image being a forward predicted frame type.

19. The system of claim 18, wherein the scene change detector determines the scene change in response to the percentage of intra-encoded macroblocks exceeding a threshold.

20. The system of claim 19, wherein the threshold is about 0.65.

21. The system of claim 17, wherein the scene change detector determines whether the image represents a scene change by determining a percentage of backward predicted macroblocks in response to the image being a bidirectionally predicted frame type.

22. The system of claim 21, wherein the scene change detector determines the scene change in response to the percentage of backward predicted macroblocks exceeding a threshold.

23. The system of claim 22, wherein the threshold is about 0.70.

24. The system of claim 17, wherein the scene change detector determines whether the image represents a scene change by determining a percentage of forward predicted macroblocks in response to the image being a bidirectionally predicted frame type.

25. The system of claim 24, wherein the scene change detector determines the scene change in response to the percentage of forward predicted macroblocks exceeding a threshold.

26. The system of claim 25, wherein the threshold is about 0.70.

27. The system of claim 17, wherein the scene change detector determines whether the image represents a scene change by:
  determining a percentage of intra-encoded macroblocks in response to the image being a forward predicted frame type;
  determining a percentage of backward predicted macroblocks in response to the image being a bidirectionally predicted frame type;
  determining a percentage of forward predicted macroblocks in response to the image being a bidirectionally predicted frame type; and
  responsive to a determined percentage exceeding a threshold corresponding to the type of macroblock, identifying the image as a scene change.

28. The system of claim 17, wherein the quantizer encodes the image in response to the determination of a scene change and the type of the frame by increasing a number of bits used to encode the image, without changing the frame type of the image.

29. The system of claim 17, wherein the quantizer encodes the image in response to the determination of a scene change and the type of the frame by changing a quantization rate used to quantize the image, without changing the frame type of the image.

30. The system of claim 17, wherein the quantizer encodes the image in response to the determination of a scene change and the type of the frame by temporarily increasing a counter of a number of bits available for encoding a remaining set of images in a group of images containing the uncompressed image.

31. The system of claim 17, wherein the quantizer encodes the image in response to the determination of a scene change and the type of the frame by temporarily increasing a counter of a number of bits allocated to images having a same frame type as the frame type of the uncompressed image, in a group of images including the uncompressed image.

32. The system of claim 17, wherein the scene change detector is further adapted, responsive to determining a scene change, to generate data identifying the uncompressed image as corresponding to a scene change, and storing the generated data in a side information file for transmission or storage.

33. A computer program product, adapted to encode video images, comprising a computer readable storage medium containing computer executable instructions executable by a processor to control the processor of a computer system for performing the operations of:
  reading from a memory of the computer system an uncompressed image including a plurality of macroblocks;
  determining a macroblock type for each of the plurality of macroblocks in the uncompressed image;
  determining whether the image represents a scene change based upon a distribution of macroblock types of the macroblocks and the frame type of the image, wherein the scene change is determined as a function of a percentage of prediction macroblocks in the image;
  encoding the image without changing the frame type of the image in response to the determination of a scene change and the frame type of the image; and
  storing the encoded image in the memory of the computer system.

34. The computer program product of claim 33, wherein determining whether the image represents a scene change, comprises:
  responsive to the image being a forward predicted frame type, determining a percentage of intra-encoded macroblocks; and
  responsive to the percentage of intra-encoded macroblocks, identifying a scene change at the image.

35. The computer program product of claim 34, further comprising:
  responsive to the percentage of intra-encoded macroblocks exceeding a threshold, identifying a scene change at the image.

36. The computer program product of claim 35, wherein the threshold is about 0.65.

37. The computer program product of claim 33, wherein determining whether the image represents a scene change, comprises:
  responsive to the image being a bidirectionally predicted frame type, determining a percentage of backward predicted macroblocks; and
  responsive to the percentage of backward predicted macroblocks, identifying a scene change at the image.

38. The computer program product of claim 37, further comprising:
  responsive to the percentage of backward predicted macroblocks exceeding a threshold, identifying a scene change at the image.

39. The computer program product of claim 38, wherein the threshold is about 0.70.

40. The computer program product of claim 33, wherein determining whether the image represents a scene change, comprises:
  responsive to the image being a bidirectionally predicted frame type, determining a percentage of forward predicted macroblocks; and
  responsive to the percentage of forward predicted macroblocks, identifying a scene change at the image.

41. The computer program product of claim 40, further comprising:
  responsive to the percentage of forward predicted macroblocks exceeding a threshold, identifying a scene change at the image.

42. The computer program product of claim 41, wherein the threshold is about 0.70.

43. The computer program product of claim 33, wherein determining whether the image represents a scene change, comprises:
  responsive to the image being a forward predicted frame type, determining a percentage of intra-encoded macroblocks;
  responsive to the image being a bidirectionally predicted frame type, determining a percentage of backward predicted macroblocks;
  responsive to the image being a bidirectionally predicted frame type, determining a percentage of forward predicted macroblocks; and
  responsive to the determined percentage exceeding a threshold corresponding to the type of macroblock, identifying the image as a scene change.

44. The computer program product of claim 33, wherein encoding the image in response to the determination of a scene change and the type of the frame comprises increasing a number of bits used to encode the image, without changing the frame type of the image.

45. The computer program product of claim 33, wherein encoding the image in response to the determination of a scene change and the type of the frame comprises changing a quantization rate used to quantize the image, without changing the frame type of the image.

46. The computer program product of claim 33, wherein encoding the image in response to the determination of a scene change and the type of the frame comprises temporarily increasing a counter of a number of bits available for encoding a remaining set of images in a group of images containing the uncompressed image.

47. The computer program product of claim 33, wherein encoding the image in response to the determination of a scene change and the type of the frame comprises temporarily increasing a counter of a number of bits allocated to images having a same frame type as the frame type of the uncompressed image, in a group of images including the uncompressed image.

48. The computer program product of claim 33, further comprising:
  responsive to determining a scene change, generating data identifying the uncompressed image as corresponding to a scene change, and storing the generated data in a side information file for transmission or storage.

49. A computer system for encoding video images, each image having a frame type, comprising:
  a processor;
  a memory;
  motion estimation means for receiving from the memory a plurality of macroblocks for an uncompressed video image and determining a macroblock type for each macroblock;
  scene change detection means for determine whether the image represents a scene change based upon a distribution of macroblock types of the image macroblocks and the frame type of the image, wherein the scene change is determined as a function of a percentage of prediction macroblocks in the image; and
  encoding means for encoding the image without changing the frame type of the image in response to the determination of a scene change by the scene change detection means and the frame type of the image, and for storing the encoded image in the memory;
  wherein the motion estimation means, scene change detection means, and the encoding means are executed by the processor.

50. The system of claim 49, wherein the scene change detection means determines whether the image represents a scene change by:
  determining a percentage of intra-encoded macroblocks in response to the image being a forward predicted frame type;
  determining a percentage of backward predicted macroblocks in response to the image being a bidirectionally predicted frame type;
  determining a percentage of forward predicted macroblocks in response to the image being a bidirectionally predicted frame type; and
  responsive to a determined percentage exceeding a threshold corresponding to the type of macroblock, identifying the image as a scene change.

51. The system of claim 49, wherein the encoding means encodes the image in response to the determination of a scene change and the type of the frame by increasing a number of bits used to encode the image, without changing the frame type of the image.

52. The system of claim 49, wherein the encoding means encodes the image in response to the determination of a scene change and the type of the frame by changing a quantization rate used to quantize the image, without changing the frame type of the image.

53. The system of claim 49, wherein the encoding means encodes the image in response to the determination of a scene change and the type of the frame by temporarily increasing a counter of a number of bits available for encoding a remaining set of images in a group of images containing the uncompressed image.

54. The system of claim 49, wherein the encoding means encodes the image in response to the determination of a scene change and the type of the frame by temporarily increasing a counter of a number of bits allocated to images having a same frame type as the frame type of the uncompressed image, in a group of images including the uncompressed image.

55. The system of claim 49, wherein the scene change detection means is further adapted, responsive to determining a scene change, to generate data identifying the uncompressed image as corresponding to a scene change, and storing the generated data in a side information file for transmission or storage.

56. A method of encoding video images, where each image has a frame type, the method executed by a computer and comprising:
　receiving a plurality of macroblocks for an uncompressed image;
　determining a macroblock type for each macroblock;
　determining whether the image represents a scene change based upon a distribution of macroblock types of the macroblocks and the frame type of the image;
　encoding the image without changing the frame type of the image in response to the determination of a scene change and the frame type of the image, wherein the encoding changes a quantization rate used to quantize the image, without changing the frame type of the image; and
　outputting the encoded image.

57. A method of encoding video images, where each image has a frame type, the method executed by a computer and comprising:
　receiving a plurality of macroblocks for an uncompressed image;
　determining a macroblock type for each macroblock;
　determining whether the image represents a scene change based upon a distribution of macroblock types of the macroblocks and the frame type of the image;
　encoding the image without changing the frame type of the image in response to the determination of a scene change and the frame type of the image, wherein the encoding temporarily increases a counter of a number of bits available for encoding a remaining set of images in a group of images containing the uncompressed image; and
　outputting the encoded image.

58. A method of encoding video images, where each image has a frame type, the method executed by a computer and comprising:
　receiving a plurality of macroblocks for an uncompressed image;
　determining a macroblock type for each macroblock;
　determining whether the image represents a scene change based upon a distribution of macroblock types of the macroblocks and the frame type of the image;
　encoding the image without changing the frame type of the image in response to the determination of a scene change and the frame type of the image, wherein the encoding temporarily increases a counter of a number of bits allocated to images having a same frame type as the frame type of the uncompressed image, in a group of images including the uncompressed image; and
　outputting the encoded image.

59. A computer program product, adapted to encode video images, comprising a computer readable storage medium containing computer executable instructions executable by a processor to control the processor of a computer system for performing the operations of:
　receiving a plurality of macroblocks for an uncompressed image;
　determining a macroblock type for each macroblock;
　determining whether the image represents a scene change based upon a distribution of macroblock types of the macroblocks and the frame type of the image;
　encoding the image without changing the frame type of the image in response to the determination of a scene change and the frame type of the image, wherein the encoding changes a quantization rate used to quantize the image, without changing the frame type of the image; and
　outputting the encoded image.

60. A computer program product, adapted to encode video images, comprising a computer readable storage medium containing computer executable instructions executable by a processor to control the processor of a computer system for performing the operations of:
　receiving a plurality of macroblocks for an uncompressed image;
　determining a macroblock type for each macroblock;
　determining whether the image represents a scene change based upon a distribution of macroblock types of the macroblocks and the frame type of the image;
　encoding the image without changing the frame type of the image in response to the determination of a scene change and the frame type of the image, wherein the encoding temporarily increases a counter of a number of bits available for encoding a remaining set of images in a group of images containing the uncompressed image; and
　outputting the encoded image.

61. A computer program product, adapted to encode video images, comprising a computer readable storage medium containing computer executable instructions executable by a processor to control the processor of a computer system for performing the operations of:
　receiving a plurality of macroblocks for an uncompressed image;
　determining a macroblock type for each macroblock;
　determining whether the image represents a scene change based upon a distribution of macroblock types of the macroblocks and the frame type of the image;
　encoding the image without changing the frame type of the image in response to the determination of a scene change and the frame type of the image, wherein the encoding temporarily increases a counter of a number of bits allocated to images having a same frame type as the frame type of the uncompressed image, in a group of images including the uncompressed image; and
　outputting the encoded image.

\* \* \* \* \*

UNITED STATES PATENT AND TRADEMARK OFFICE
CERTIFICATE OF CORRECTION

| | | |
|---|---|---|
| PATENT NO. | : 7,856,054 B1 | Page 1 of 1 |
| APPLICATION NO. | : 10/714076 | |
| DATED | : December 21, 2010 | |
| INVENTOR(S) | : Vikrant Kasarabada et al. | |

It is certified that error appears in the above-identified patent and that said Letters Patent is hereby corrected as shown below:

In column 6, line 32, delete "bit rate" and insert -- bit_rate --, therefor.

In column 6, line 33, delete "picture rate" and insert -- picture_rate --, therefor.

In column 6, line 35, delete "$d_j^p \; d_j^b \, |$" and insert -- $d_j^p$ or $d_j^b$ --, therefor.

Signed and Sealed this
First Day of November, 2011

David J. Kappos
*Director of the United States Patent and Trademark Office*